Dec. 5, 1939.  H. H. HARRIS  2,182,201
CARBURIZING BOX
Original Filed July 28, 1937
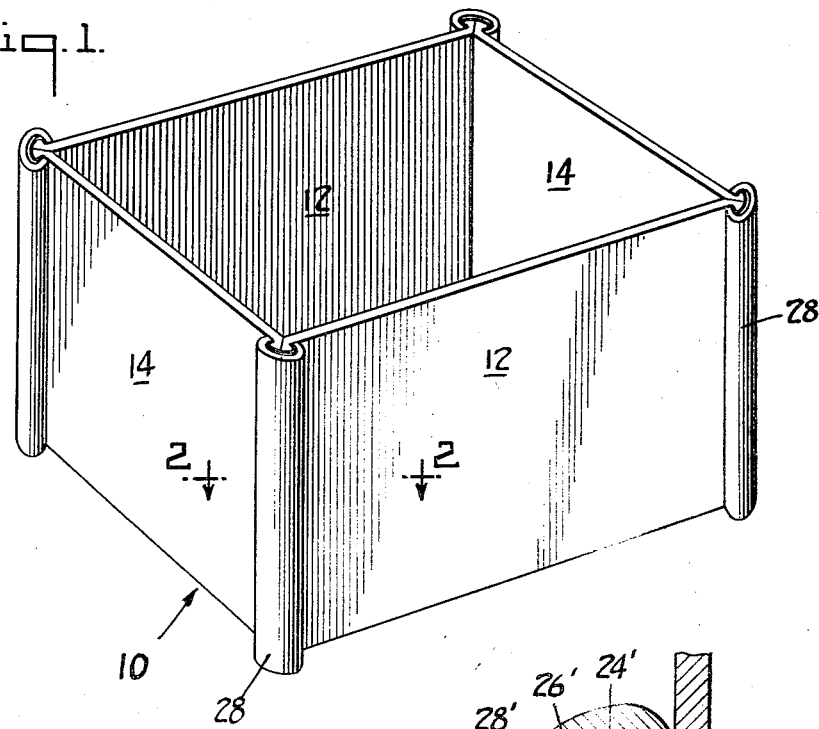
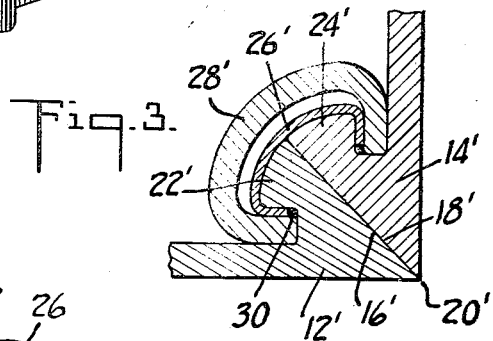
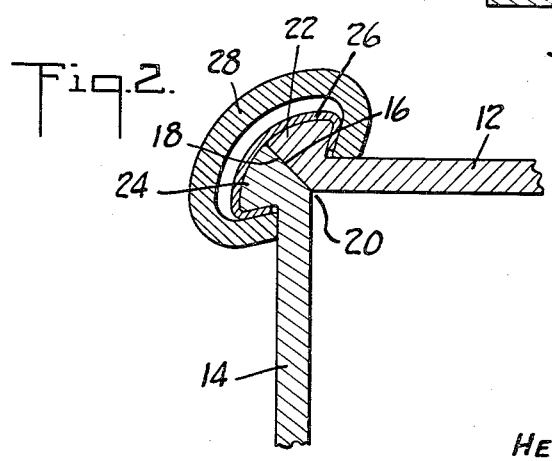
INVENTOR
HENRY H. HARRIS
BY
Dyke and Schaines
ATTORNEYS Patented Dec. 5, 1939

2,182,201

UNITED STATES PATENT OFFICE 2,182,201

CARBURIZING BOX

Henry H. Harris, Champaign, Ill.

Application July 28, 1937, Serial No. 156,042
Renewed May 6, 1939

6 Claims. (Cl. 263—49)

My invention relates to containers for use in heat-treating furnaces, in connection with which use said containers are known as carburizing boxes.

Carburizing boxes are subjected in use to alternate heating and cooling which set up strains and shrinks in the box ultimately causing failure thereof. Box failures are also induced by handling operations during which the boxes are sometimes subjected to severe load-bearing and compression stresses during travel through the furnace. I have found it highly satisfactory from the economic standpoint to use a container formed of a plurality of sections removably secured together, and it is, therefore, the main object of the present invention to provide a carburizing box composed of a plurality of sections locked together against displacement by ordinary usage thereof.

On occasion articles to be heat-treated or carburized are disposed in the box packed within a heat releasable carburizing compound, which operation necessitates an almost hermetic sealing of the box and contents, and it is a further object of my invention to provide a carburizing box composed of a plurality of sections tightly locked together and sealed against escape of gases therefrom while the box is in use.

Further objects will in part be apparent and in part pointed out specifically in connection with the following description of an illustrative embodiment.

In the drawing annexed hereto and made a part hereof,

Fig. 1 is a perspective view of one form of box constructed according to and embodying my invention;

Fig. 2 is an enlarged section through one corner of the box, as on the line 2—2 of Fig. 1; and Fig. 3 is a similar section of a modified form.

My improved box is designated generally by reference numeral 10, and comprises cast side sections 12, 12, forming the side walls and similar sections 14, 14, forming the end walls thereof. The corners of each of these sections 12, 12, and 14, 14 are angulated as at 16, 18, respectively, forming a miter joint with the angled faces abutting flatly against each other in parallelism as at 20.

Enlargements 22, 24 are formed on the outer surfaces of the angulated sides and ends which extend lengthwise of the said sections and I provide a spring clip 26, which clamps over said angle head enlargements to lock and secure the side and end sections together. This spring clip insures a more or less pressure tight assembly, but, as a safeguard, I provide a cast outer clip 28 which fits over spring clip 26 to double-lock the sections together.

In Fig. 3, I have shown a modification in which the enlargements 22', 24' are formed within the box and the spring clip 26' and over-clip 28' in place over the enlargements are within the box. Optionally, I may spot weld either the spring clip 26' or the over-clip 28' to the sections, as shown at 30, but my construction operates satisfactorily without any welding therein whatsoever.

The advantages of my form of carburizing box are obvious. For one thing, it is easy of assembly. For another thing, it is very economical, since carburizing boxes never fail all over but only at some single point, and any worn section can readily be replaced to renew the box.

In the drawing, I have illustrated my invention as an open ended body structure, that is, the side walls portion of the box. This side walls portion is set into, in use, a dished portion comprising a cover for one end, and a similar portion is placed over to cover the other end, providing a complete article.

Having described my invention, what I claim and desire to secure by Letters Patent is:

1. A carburizing box comprising a pair of side wall sections and a pair of end wall sections, the vertical edges of each of which sections are angulated, enlarged and widened to provide a substantial increase in edge area, said side and end wall sections being disposed in edge abutting relationship at right angles to each other, the angulated, enlarged and widened edges of said sections abutting to form a mitre joint, and spring clip means overlying said enlarged edges to secure the sections in said relationship.

2. A box as defined in claim 1 in which the enlarged edges of said side and end wall sections are disposed within the box and the securing means are similarly within the box.

3. A box as defined in claim 1 in which the enlarged edges of said side and end wall sections are disposed on the outside of the box and the securing means are similarly on the outside thereof.

4. A carburizing box comprising a pair of side wall sections and a pair of end wall sections, said sections having enlarged edges and being disposed in edge abutting relationship at right angles to each other, and means to secure said sections together to complete the box comprising a spring clip overlying the enlarged edges and a cast clip overlying both said enlarged edges and spring clip.

5. A box as defined in claim 4 in which the enlarged edges are disposed within the box and the securing means are similarly within the box.

6. A box as defined in claim 4, in which the enlarged edges are disposed on the outside of the box and the securing means are similarly on the outside thereof.

HENRY H. HARRIS.